United States Patent [19]

Piccone

[11] 4,301,766
[45] Nov. 24, 1981

[54] FURNITURE DEVICE FOR CATS

[76] Inventor: James Piccone, 803 Kathy Dr., Yardley, Pa. 19067

[21] Appl. No.: 103,263

[22] Filed: Dec. 13, 1979

[51] Int. Cl.³ .................... A01K 1/00; A01K 13/00
[52] U.S. Cl. .................................. 119/1; 119/29; 119/83; 272/113
[58] Field of Search ............... 119/1, 15, 19, 29, 83, 119/156, 157; 272/113

[56] References Cited

U.S. PATENT DOCUMENTS

| | | | |
|---|---|---|---|
| 1,568,226 | 1/1926 | Larson | 119/83 |
| 1,582,144 | 4/1926 | Pflaum | 119/83 |
| 1,870,957 | 8/1932 | Meriaux | 119/83 |
| 2,865,329 | 12/1958 | Elliot | 119/83 |
| 2,976,841 | 3/1961 | Scheffer | 119/83 |
| 3,496,912 | 2/1970 | Cockrell | 119/19 |
| 3,552,356 | 1/1971 | Rosenthal | 119/1 |
| 3,581,707 | 6/1971 | Cook | 119/1 |
| 3,632,109 | 1/1972 | Dattner | 272/113 X |
| 3,941,092 | 3/1976 | Winters | 119/19 |
| 4,022,263 | 5/1977 | Beckett et al. | 160/92 |

FOREIGN PATENT DOCUMENTS

| | | | |
|---|---|---|---|
| 103157 | 4/1924 | Fed. Rep. of Germany | 119/83 |
| 893224 | 4/1962 | United Kingdom | 119/157 |

Primary Examiner—Gene Mancene
Assistant Examiner—Robert P. Swiatek
Attorney, Agent, or Firm—John J. Kane; Frederick A. Zoda; Albert Sperry

[57] ABSTRACT

A furniture device for cats is disclosed comprising a basic housing design being generally rectangular and preferably defining a plurality of circular apertures in the sides thereof. Each aperture is designed to receive a frame therein which is preferably annular and includes a grooming device such as a brushing or combing device extending inwardly across the opening and defined within the annular frame. With this configuration as animals such as cats enter and exit the housing an automatic grooming operation will occur on the external hair or surface thereof to prevent the shedding of loose hairs on floors and other areas where such shedding is undesirable. The individual frames will be each detachably securable to the apertures in the sides of the housing by a snap-in, snap-out arrangement or a threaded arrangement to facilitate washing of the grooming device periodically. Also, the external surfaces of the housing will include connection devices therein which allow individual housing structures to be detachably connected to other similarly configured housings to form inter-locking configurations thereof.

9 Claims, 4 Drawing Figures

FURNITURE DEVICE FOR CATS

BACKGROUND OF THE INVENTION

1. Field of the Invention

The present invention deals with the field of grooming devices for pets. The present invention also deals with the field of pet furniture that is, appliances, useful for the enjoyment and exercising of domesticated animals.

The present invention combines these two fields of art into a single usable device which is convenient with respect to washing due to the detachable nature of the grooming aids with respect to the individual furniture housings.

2. Description of the Prior Art

The prior art of the present invention concerning grooming devices includes U.S. Pat. Nos. 2,976,841 and 1,568,226 and 2,865,329 and 1,582,144. Each of these patents discloses a grooming device for currier usable in the care of the coat or external hair of animals. Particularly, the patents include fixedly located stations whereby an animal may voluntarily itself pass through the grooming device. None of these devices shows any inter-connection between pet furniture and the individual grooming devices.

U.S. Pat. Nos. 3,941,092 and 3,496,912 disclose animal housing configurations including apertures and orifices defined in the walls of the housing. Also, U.S. Pat. No. 4,022,263 discloses a magnetically actuated cat door. None of these devices discloses the detachable inter-relationship between a pet grooming device and a pet housing device.

SUMMARY OF THE INVENTION

The present invention provides a furniture device particularly usable for cats which includes a housing means having a plurality of sides and defining an enclosure therein. Each of these sides is preferably rectangular. Also, each of the sides preferably defines an aperture being usually circular throughwhich an animal may pass into and out of the housing.

The present invention contemplates a frame means which is selectively securable within each of the aperture means wherein the frame means carries a brushing means which extends radially inwardly toward the center of an opening defined within the frame means. In this manner the frame means will groom the external hair of a cat while the cat walks through the aperture into the enclosure within the housing means.

The frame means will be individually detachably securable with respect to the aperture means of each frame means to allow the removal of these individual grooming means for convenience of washing.

The present invention also includes a plurality of detachable connection means which are positioned on the external surfaces of the sides of the housing means and are adapted to detachably connect to similarly configured housing means to thereby form inter-locking configurations of more than one of the housing means. In this manner, the individual housing means can form longitudinally extending groups of housing or can provide vertical inter-locking configurations such as pyramidal configurations as shown in FIG. 2.

The housing means of the present invention will most likely be found to be conveniently made approximately cubicle to facilitate the inter-locking relationship between individual housings. Each of the frame means will preferably be circular and in this manner the frame itself will be of an angular configuration. With this configuration, the grooming means will usually comprise either a brushing means or a combing means which extends radially inward across the opening of the frame. In this manner as a cat passes inward or outward from the housing the external hair of the cat will automatically be groomed.

The detachable connection means between the frame means and the aperture in the walls of the enclosure may comprise a threaded section on the external periphery of the frame means and another mated threaded section on the inner edge of the aperture means. In this manner the frame means may easily be screwed into place or unscrewed for convenience of washing.

As an alternative inter-locking configuration the securement means may include a protruding rim of resilient material which is adapted to snap into place in an interlocking position behind an inwardly extending edge of the aperture means of the housing.

Also, it is preferable that the frame means includes a void area along the lowermost edge of the opening such that this void area does not have any grooming means therein since it has been found that cats and other domesticated animals are not attracted to such grooming devices when it includes a grooming of the lower stomach area of the animal.

It is an object of the present invention to provide a furniture device for cats including a housing means which is detachably securable with respect to other housing means of a similar configuration.

It is an object of the present invention to provide a furniture device for cats including a plurality of frame means which are detachably securable with respect to the main housing means.

It is an object of the present invention to provide a furniture device for cats wherein a brushing means is detachably securable with respect to apertures defined within a housing means.

It is an object of the present invention to provide a furniture device for cats having a housing means defining a plurality of circular apertures in the outer walls thereof each of said apertures adapted to receive a grooming means extending thereacross such that when cats or other animals enter the housing and exit the housing a grooming of the external fur of the animal will be achieved.

It is an object of the present invention to provide a furniture device for cats utilizing a generally U-shaped grooming means including a void area along the lower surface thereof.

It is an object of the present invention to provide a furniture device for cats which is capable of inter-locking with similarly configured furniture devices or housings to form pyramidal configurations or longitudinally extending configurations.

It is an object of the present invention to provide a furniture device for cats including a housing means having a plurality of grooming means detachably secured thereto by a snap-in and snap-out arrangement.

It is an object of the present invention to provide a furniture device for cats including a brush means extending over the openings throughwhich cats pass when entering or exiting from the housing.

It is an object of the present invention to provide a furniture device for cats which is relatively inexpensive and easily maintained.

BRIEF DESCRIPTION OF THE DRAWINGS

While the invention is particularly pointed out and distinctly claimed in the concluding portions herewith, a preferred embodiment is set forth in the following detailed description which may be best understood when read in connection with the accompanying drawings, in which:

DETAILED DESCRIPTION OF THE PREFERRED EMBODIMENT

Figure 1:
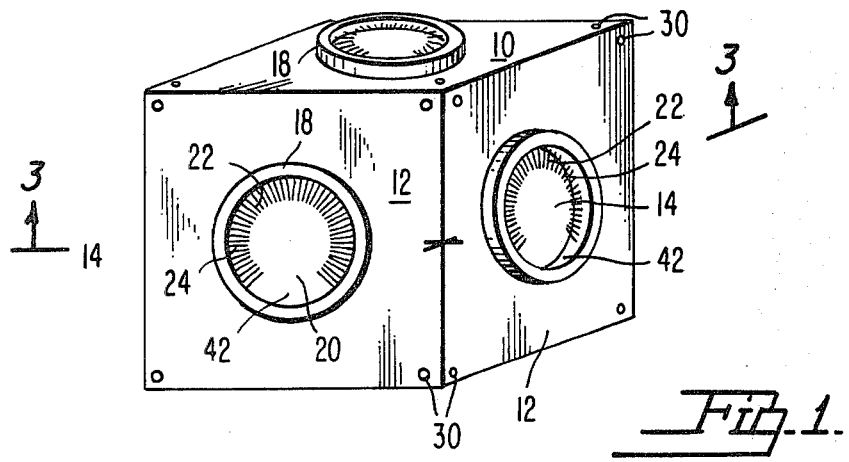
FIG. 1 is a perspective view of an embodiment of the furniture device of the present invention.

The present invention provides a furniture device particularly usable for cats including a housing means 10 which may be of generally rectangular configuration or also could be more preferably cubical providing six approximately equal rectangular or square sides 12. The sides 12 of housing means 10 define an internal enclosure 14. This general configuration will provide a house-type device for domesticated animals such as cats, such that the cats will desire to enter and exit the housing means 10 periodically.

To facilitate this entry and exit a plurality of aperture means 16 may be configured within the sides 12 of housing means 10. Preferably these aperture means are of a circular configuration. The present invention contemplates the detachable securement of a frame means 18 preferably of an annular configuration into place adjacent the aperture means 16. This frame will define an opening 20 therein which may also be preferably circular. This opening 20 will then provide the entry and exit path for domesticated animals passing into the enclosure 14 and passing out of the enclosure 14.

The frame means 18 will be configured to have secured thereto a grooming means 22. This grooming means may comprise a brush means 24 or a comb means 26. With either of these configurations, the grooming means 22 will be adapted to groom the external hair of a domesticated animal while entering or exiting of the housing means 10 through the opening 20 in frame means 18. This grooming will occur automatically since the grooming means 24 will actually extend across the opening 20 of the frame means 18 and thereby also across the aperture means 16 of sides 12.

As the shedded hair accumulates upon the grooming means 22 it will be desirable to remove or periodically clean said means. To facilitate this operation a detachable securement means 28 is utilized as the means of securement of the brush means 24 or comb means 26 to the aperture 16 of housing means 10. By utilizing such a detachable securement means 28 the actual cleaning operation of the grooming means 22 will be greatly facilitated.

Figure 3:
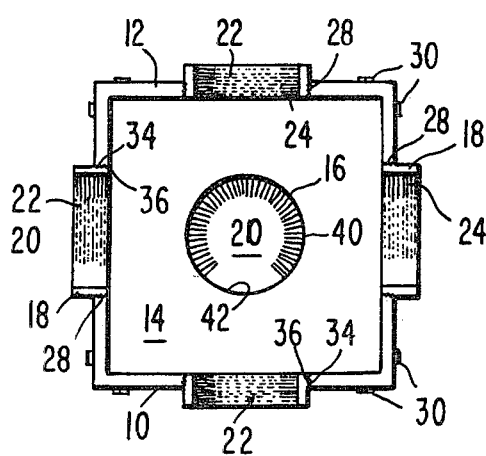
FIG. 3 is a cross-section of an embodiment of the invention as shown in FIG. 1 along lines 3—3 and FIG. 4 is a similar cross-section of an embodiment as shown in FIG. 3 wherein the grooming means comprises combing devices.
Figure 4:
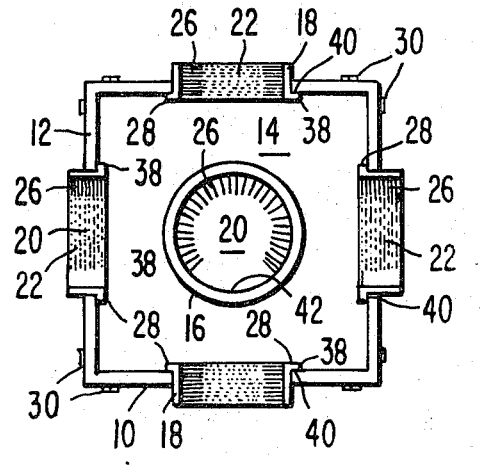

Many alternative configurations for the detachable securement means 28 are conceivable however the present invention discloses two particular designs shown in FIGS. 3 and 4. FIG. 3 shows the usage of mated threaded sections. In particular mated threaded section 34 is located on the external periphery of the frame 18 itself whereas mated threaded section 36 is located on the innermost edges of aperture means 16. These two mated sections 34 and 36 will allow the individual frame means 18 and the associated grooming means 22 to be threaded into a secured position with respect to the aperture 16 and to be unthreaded as necessary for washing thereof.

Another alternative configuration for the detachable securement means 28 may include a protruding rim 38 as shown best in FIG. 4. This protruding rim 38 will preferably be of a resilient material such that when pressure is applied externally to insert the frame means 18 into the aperture 16 the resilient protruding rim 38 will collapse slightly and allow the insertion therein. Once the protruding rim 38 has passed the inner edge 40 of aperture 16 it will snap outwardly and lock the frame member in place. This is a convenient single step placement operation achievable by the usage of such snap-in, snap-out arrangement.

In order to encourage the usage of the housing means 10 of the present invention a void area 42 is included on the frame means 18. This void area 42 will be devoid of any grooming means 22 including brushing means 34 and comb means 26 and will be located at the lowermost area where the underbelly of an animal will be located during movement of the animal into and out of the housing means 10. It has been found that extension of such a grooming means in the lower area to contact the underbelly of an animal or domesticated cat will discourage passage through the opening. It is for this reason that the present invention preferably includes the void area 42 adjacent the lowermost edge of frame means 18.

Figure 2:
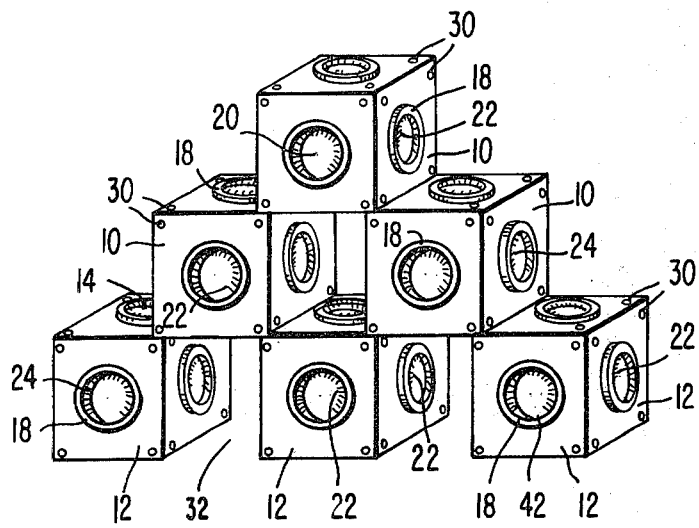
FIG. 2 is a view of a plurality of the embodiments shown in FIG. 1 shown in inter-locking configurations.

The present invention is also preferably usable by the inclusion of multiple housing means 10 being interconnected. This overall configuration is achieved by the usage of detachable connection means 30. These connection means are located preferably on all of the external sides 12 of the housing means 10 and are adapted to be interlocked with similarly configured housing means 10 to form overall inter-locking housing configurations 32 as best shown in FIG. 2. Particularly, FIG. 2 shows a pyramidal configuration achievable by proper orientation of the individual housing means 10 with respect to the detachable connection means 30 of adjacent housing means. Other configurations are also possible including longitudinally extending consecutive housing means 10 as well as vertically extending configurations. With these devices the furniture-type devices have been shown to be more attractive for usage by animals such as domesticated cats.

While particular embodiments of this invention have been shown in the drawings and described above, it will be apparent that many changes may be made in the form. Arrangement and positioning of the various elements of the combination. In consideration thereof it should be understood that preferred embodiments of this invention disclosed herein are intended to be illustrative only and not intended to limit the scope of the invention.

I claim:

1. A furniture device for cats comprising:
   (a) a housing means including a plurality of sides defining an enclosure therewithin, said housing means further defining at least one aperture means located therein;
   (b) at least one frame means selectively securable to said aperture means of said housing means, said frame means being annular to define an opening therein;

(c) a grooming means fixedly secured to said frame means and extending radially inwardly from the top and sides of the innermost edge thereof across said opening defined by said frame means to groom the external hair of a cat passing through said apertures defined in said sides of said housing means without contacting its underside;

(d) a detachable securement means located adjacent said aperture means and said frame means to detachably secure said grooming means and said frame means in place within said aperture means, said detachable securement means comprising mated threaded sections on the external periphery of said frame means and on the inner edge of said aperture means; and (e) detachable connection means positioned in the external surfaces of said sides of said housing means and being adapted to detachably connect to similarly configured housing means to form inter-locking configurations or more than one of said housing means.

2. The device as defined in claim 1 wherein said housing means is approximately cubical.

3. The device as defined in claim 1 wherein said opening within said frame means is circular.

4. The device as defined in claim 1 wherein said grooming means comprises a brush means.

5. The device as defined in claim 1 wherein said grooming means comprises a comb means.

6. The device as defined in claim 1 wherein said housing means is cubical and includes one of said apertures, said frame means and said grooming means in each of said sides.

7. The device as defined in claim 1 wherein said housing means includes said detachable connection means on all external sides thereof.

8. A furniture device for cats comprising:
(a) a housing means including a plurality of rectangular sides defining an enclosure therewithin, said housing means further defining a circular aperture means in each of said rectangular sides;
(b) an annular frame means selectively securable to each of said aperture means of said housing means, said frame means defining a circular opening therein;
(c) a brushing means fixedly secured to said frame means and extending radially inwardly across said opening defined by said frame means to groom the external hair of a cat passing through said apertures defined in said sides of said housing means, said frame means further including a void area along the lowermost edge of said opening which is devoid of said grooming means;
(d) a detachable securement means located adjacent each of said aperture means and each of said frame means to detachably secure said brushing means and said frame means in place within said aperture means, said detachable securement means comprising mated threaded sections on the external periphery of said frame means and on the inner edge of said aperture means; and
(e) detachable connection means positioned on the external surface of each of said sides of said housing means and being adapted to detachably connect to similarly configured housing means to form interlocking configurations of more than one of said housing means.

9. A furniture device for cats comprising:
(a) a housing means including a plurality of sides defining an enclosure therewithin, said housing means further defining at least one aperture means located therein;
(b) at least one frame means selectively securable to said aperture means of said housing means, said frame means being annular to define an opening therein;
(c) a grooming means fixedly secured to said frame means and extending radially inwardly from the top and sides of the innermost edge thereof across said opening defined by said frame means to groom the external hair of a cat passing through said aperture means defined in said sides of said housing means without contacting its underside;
(d) a detachable securement means located adjacent said aperture means and said frame means to detachably secure said grooming means and said frame means in place within said aperture means, said detachable securement means including a protruding rim of resilient material adapted to snap into interlocking position behind the inwardly extending edge of said aperture means of said housing; and
(e) detachable connection means positioned in the external surfaces of said sides of said housing means and being adapted to detachably connect to similarly configured housing means to form interlocking configurations or more than one of said housing means.

* * * * *